April 1, 1930.  B. A. RYAN  1,752,616
ROLLER BEARING
Filed April 26, 1926
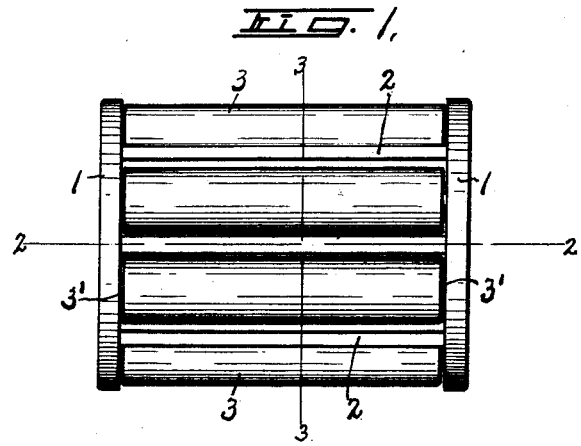
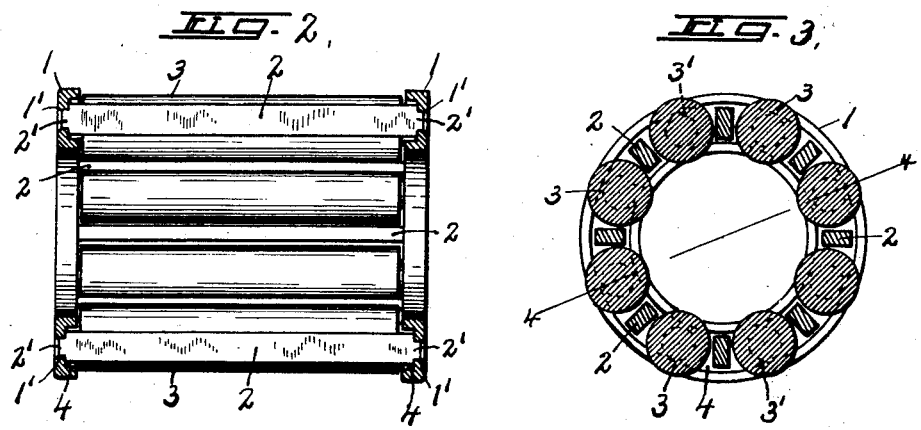
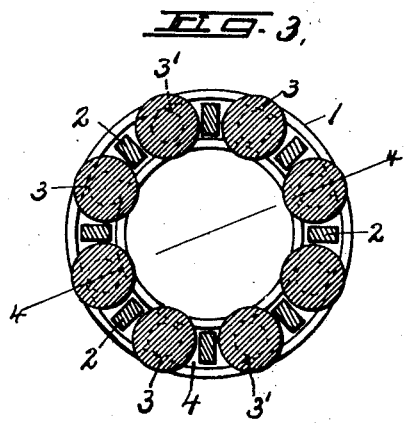
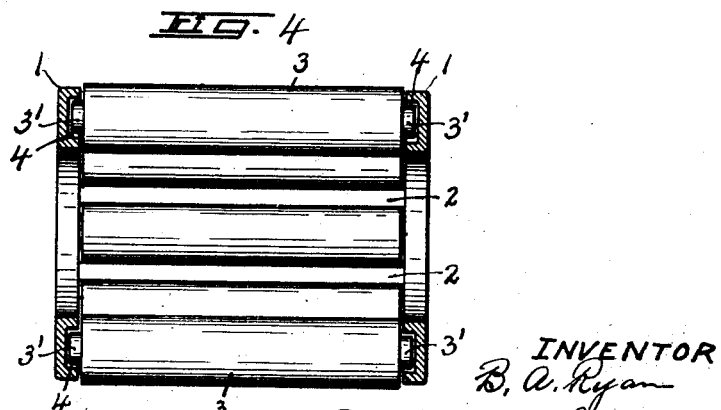
INVENTOR
B. A. Ryan
BY Denison & Thompson
ATTORNEYS
WITNESS Patented Apr. 1, 1930

1,752,616

UNITED STATES PATENT OFFICE

BERNARD A. RYAN, OF SYRACUSE, NEW YORK

ROLLER BEARING

Application filed April 26, 1926. Serial No. 104,709.

This invention relates to a roller bearing in which the rollers are arranged in uniformly spaced relation about the axis of a suitable cage for rolling motion relatively thereto and are held in circumferentially spaced relation by intervening spacer bars which in turn are supported at their ends in suitable rings to form the cage.

The main object is to permit the use of a greater number of rollers without increasing the diameter of the rings or reducing the diameter of the rollers than has heretofore been practised and at the same time to increase the rigidity of the cage in which the rollers are mounted.

In other words, the specific object is to connect the end rings by means of flat and relatively narrow spacer bars arranged edgewise radially about the axis of the rings so as to increase the space available for a greater number of rollers without varying the diameters of the rings or rollers.

Another object is to connect the ends of the bars to the adjacent rings in such manner as to increase the rigidity of the cage as a whole and thereby to maintain a more perfect parallelism between the axes of the rollers and rings.

Other objects and uses relating to specific parts of the device will be brought out in the following description.

In the drawings:—

Figure 1 is a face view of the roller bearing embodying the features of my invention.

Figure 2 is a longitudinal sectional view taken on line 2—2, Figure 1.

Figure 3 is a transverse sectional view on line 3—3, Figure 1.

Figure 4 is a longitudinal sectional view taken in the plane of line 4—4, Figure 3.

As illustrated, this roller bearing comprises a pair of opposed co-axial end rings —1—, lengthwise spacer bars —2— connecting the rings and rollers —3— between the rings and alternately with the bars —2— circumferentially around the axis of the rings.

The rings —1— are identical in form and size and interchangeable and are preferably made of hardened steel or other suitable means and provided on their inner ends with annular channels —4— concentric with the axis of the rings and of equal diameters.

The spacer bars —2— are also of uniform size and shape for interchangeability and are preferably made of flat hardened steel or equivalent material of less radial width than the diameter of the rollers and of less circumferential thickness than their radial width but preferably rectangular in cross section so that their inner and outer edges and also their opposite side faces are parallel both lengthwise and transversely.

These spacer bars are arranged edgewise radially in uniformly spaced relation circumferentially about the axis of the rings —1— and equal distances from said axis with their ends seated in the annular channels —4— of the corresponding rings and provided with radially reduced portions —2'— midway between their lengthwise edges for securement in corresponding openings —1'— in the outer end walls of the channels —4—.

These reduced ends —2'— of the bars and their corresponding openings —1'— are rectangular in cross section so that when the reduced ends —2'— are secured by riveting or otherwise in the openings —1'— the bars and rings will be firmly held against relative endwise, radial or circumferential movement, said bars and rings constituting what may be termed the roller supporting cage.

Reducing the ends as —2'— of the bars forms shoulders near the ends of the bars to abut against the inner faces of the end walls of the channels while the outer ends of the reduced portions —2'— may be upset or riveted against the outer faces of said end walls to increase the rigidity of the cage.

The rollers —3— are also made of hardened steel or equivalent material of uniform size for interchangeability and are arranged in circumferentially spaced relation about the axis of the rings and between the spacer bars —2— and also between the rings —1—.

These rollers are provided with opposite reduced cylindrical ends —3'— of slightly less diameter than the radial width of the channels —4— into which they are extended, the inner and outer walls of the channels serving to retain the rollers in operative position against radial displacement and in circumferential alinement with the spacer bars —2—.

The diameter of the rollers is slightly greater than the radial depth of the rings to allow the periphery of the roller to extend beyond the inner and outer peripheries of said rings for contact with the journal and journal bearing not shown.

The construction of the spacer bars —2— in the manner described and their radial arrangement edgewise on the rings constitutes not only a rigid cage but also permits the use of a greater number of rollers —3— than would be possible with the use of a cage having round spacer bars having the same strength as the flat bars shown.

What I claim is:—

In a roller bearing of the character described, the combination with a plurality of rollers arranged in uniformly spaced relation circumferentially about an axis and having their opposite ends reduced to form cylindrical supporting members or trunnions, of a pair of axially spaced coaxial end rings continuous throughout their circumferential lengths, annular channels in their inner ends for receiving the reduced cylindrical end portions of the rollers for supporting said rollers, the outer ends of said rings being provided with relatively small rectangular radially disposed openings therethrough midway between the inner and outer peripheries of said rings, the radial depth of said openings being greater than their circumferential width and less than the radial distance between the walls of said annular channels, spacer bars interpositioned between the rollers having substantially the same circumferential width as the corresponding openings and their opposite ends reduced in radial with corresponding to the radial depth of the openings and secured therein to hold the rings in axially spaced relation parallel with each other.

In witness whereof I have hereunto set my hand this 20th day of April, 1926.

BERNARD A. RYAN.